May 21, 1963
J. W. DRAYTON
3,090,575
APPARATUS FOR HANDLING MANDRELS USED IN THE
FABRICATION OF TUBULAR STOCK
Filed June 29, 1960
7 Sheets-Sheet 1
Fig. 1
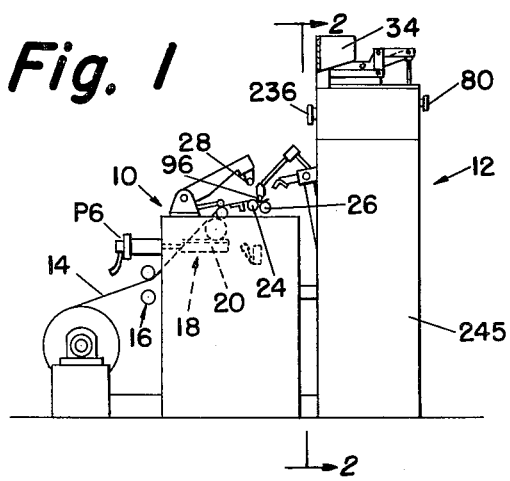
Fig. 12
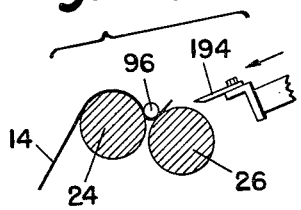
Fig. 15
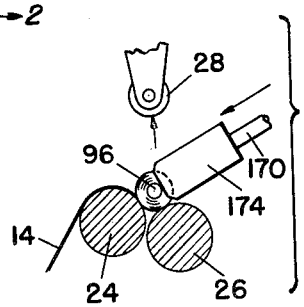
Fig. 13
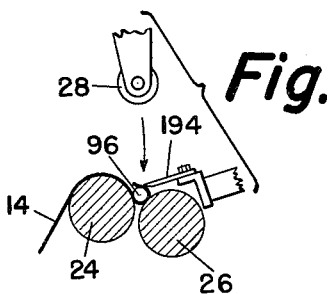
Fig. 16
Fig. 14
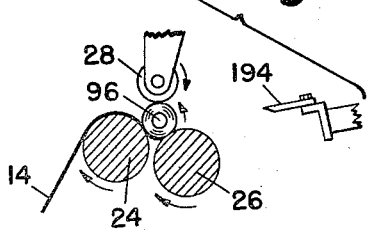
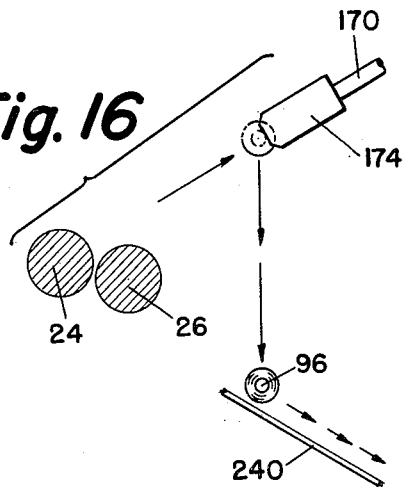
INVENTOR.
JOHN W. DRAYTON
BY
Busser, Smith & Harding
ATTORNEYS May 21, 1963
J. W. DRAYTON
3,090,575
APPARATUS FOR HANDLING MANDRELS USED IN THE
FABRICATION OF TUBULAR STOCK
Filed June 29, 1960
7 Sheets-Sheet 2
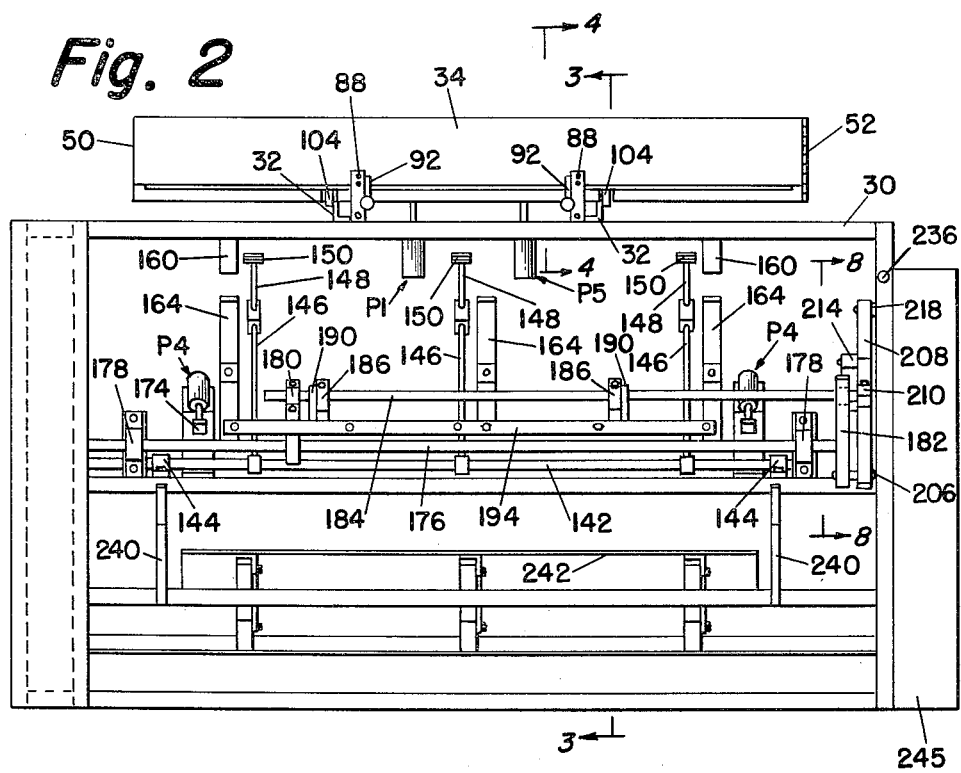
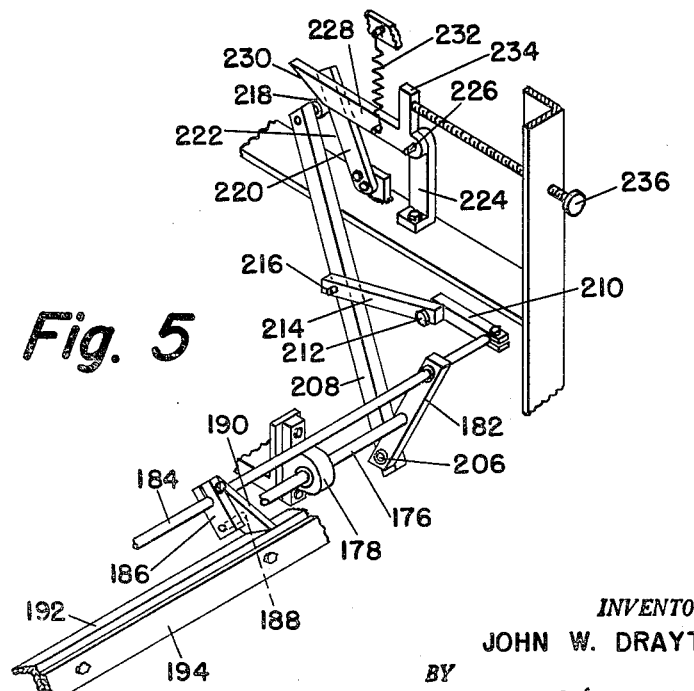
INVENTOR.
JOHN W. DRAYTON
BY
Buell, Smith & Harding
ATTORNEYS May 21, 1963 J. W. DRAYTON 3,090,575
APPARATUS FOR HANDLING MANDRELS USED IN THE
FABRICATION OF TUBULAR STOCK
Filed June 29, 1960 7 Sheets-Sheet 3

INVENTOR.
JOHN W. DRAYTON
BY
Besser, Smith & Harding
ATTORNEYS

INVENTOR.
JOHN W. DRAYTON
BY
Busser, Smith + Harding
ATTORNEYS

May 21, 1963  J. W. DRAYTON  3,090,575
APPARATUS FOR HANDLING MANDRELS USED IN THE
FABRICATION OF TUBULAR STOCK

Filed June 29, 1960  7 Sheets-Sheet 5

*INVENTOR.*
JOHN W. DRAYTON
BY
Bersser, Smith & Harding
ATTORNEYS

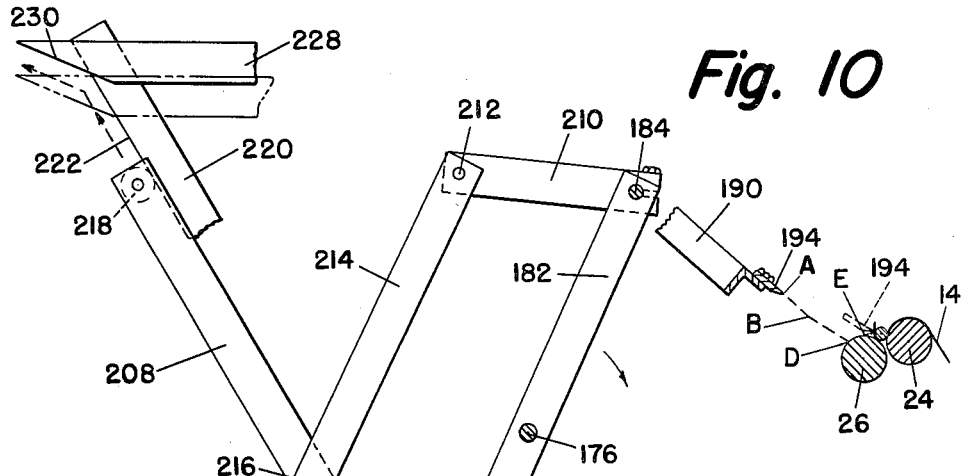
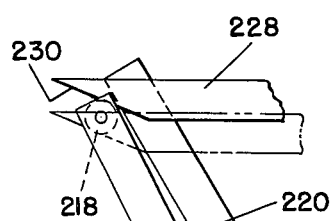
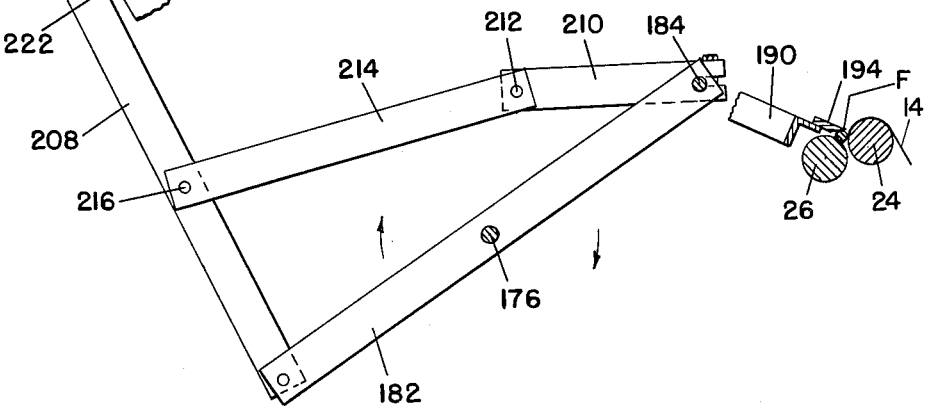

United States Patent Office 3,090,575
Patented May 21, 1963

3,090,575
APPARATUS FOR HANDLING MANDRELS USED IN THE FABRICATION OF TUBULAR STOCK
John W. Drayton, Waterloo Ave., and Sugartown Road, Berwyn, Pa.
Filed June 29, 1960, Ser. No. 39,623
6 Claims. (Cl. 242—66)

This invention relates generally to the fabrication of tubular stock, and particularly to improvements in apparatus for fabricating a laminated tubular member from a single web of sheet material treated with resins or similar substances.

It is common to make such tubular stock by winding a web of paper that is impregnated with phenol formaldehyde resin about a mandrel. The leading or terminal end portion of the paper web is positioned across a pair of rollers, and the mandrel is manually laid upon the terminal portion of the web and nested between the rollers aforesaid. A head roller is lowered upon the mandrel, and all three rollers are turned in tube rolling direction at the same surface speed. At the same time, these rollers coact to bring heavy pressure to bear upon the mandrel and the tube being formed thereon so that the tube rolling operation may take place against the influence of a heavy drag applied to the web for drawing it taut. The mandrel and one or more of the rollers are heated so that the resin is softened sufficiently to cross the convolutions of paper, under the influence of the heat and pressure to adhere to each other. The product is a very tightly wound tube which, after oven curing, and removal of the mandrel, has a high density, excellent electrical dielectrical properties and good mechanical strength. However, difficulty is experienced in initially getting the paper web to adhere to the mandrel so that the rolling operation may get under way, particularly when the mandrel is small in diameter, for example, in the order of one-eighth to three-fourths of an inch in diameter. The reason, of course, is that the leading end portion of the paper web must be sharply curled around the mandrel, and the available mandrel surface area with which the paper web may make contact and to which it may adhere is very limited, in consequence of which the paper web has a strong tendency to uncurl and to resist being attached to the mandrel.

To cope with this difficulty, the common practice is to extend the web all the way around the mandrel with plenty to spare, use a hand tool to fold the terminal portion of the web sharply back upon itself and to tuck the same between the mandrel and an unfolded area of the web. This terminal end portion of the web is rolled into the core of the tube. For several reasons, this procedure has not proved to be entirely satisfactory. Such tubes are substantially lower in density and mechanical strength, and they are subject to greater water absorption, in consequence of which they are generally inferior in quality to tubes without tucked webs.

Since the folded terminal portion of the web is double the paper thickness, when the operator is pressed for time, he is tempted to make the folded back terminal portion of the web unduly long. Thus, while the tube may be wound in a comparatively short time, it may be weakened by tucks that are excessive in length.

When the web is tucked in the manner aforesaid, a large amount of resin must be placed upon the back of the paper so that when the terminal web portion is folded back upon itself, the contacting surface areas will adhere to each other. When no such tuck is used, almost all of the resin may be placed on the front of the paper, which is an important advantage because during operation of the apparatus a heat insulating coat of resin builds up slowly upon the heated roller supporting the mandrel, and means must be provided for keeping this roller free of resin. The resin deposited upon the roller is transferred to the roller from the back of the web, in consequence of which the lighter the coat of resin upon the back of the web, the slower will be the transfer of resin to the roller.

When maximum mechanical strength is required, the tucked in part of the core must be bored out of the tube, which requires an additional machining operation, with all of its inconvenience and with all of the needless expense.

Accordingly, an object of the invention is to provide apparatus capable of winding a web of sheet material about a mandrel without any necessity for wrapping a folded end portion of the web around the mandrel and tucking it between the mandrel and an unfolded web area to start the winding operation.

Another object is to provide such apparatus capable of holding the unfolded leading end portion of the web to a small diameter mandrel so that the winding operation may be carried out against the influence of drag applied to the web to draw the same taut.

Another object is to provide means for mechanically positioning a mandrel for the winding operation and for mechanically removing the mandrel and the tube formed thereon after the winding operation, thereby to free the operator for operating two or more machines while at the same time increasing the output of each machine.

Other objects of the invention will become apparent when the following description is read with reference to the accompanying drawings, in which:

FIGURE 1 is a side elevation of tube rolling and mandrel handling apparatus constructed in accordance with the invention, showing the mandrel handling machine about to deposit a mandrel upon the tube rolling machine;

FIGURE 2 is an enlarged vertical section on the plane indicated by line 2—2 of FIGURE 1 looking at the back of the mandrel handling machine and showing the latter approaching the stage of operation indicated in FIGURE 1;

FIGURE 5 is a fragmentary perspective view looking at the back of the mandrel handling machine;

FIGURES 10 and 11 are similar to FIGURES 8 and 9, respectively, but a mandrel much smaller in diameter is illustrated;

FIGURES 12 to 16 are diagrammatic representations of the apparatus in various stages of operation.

Figure 3:
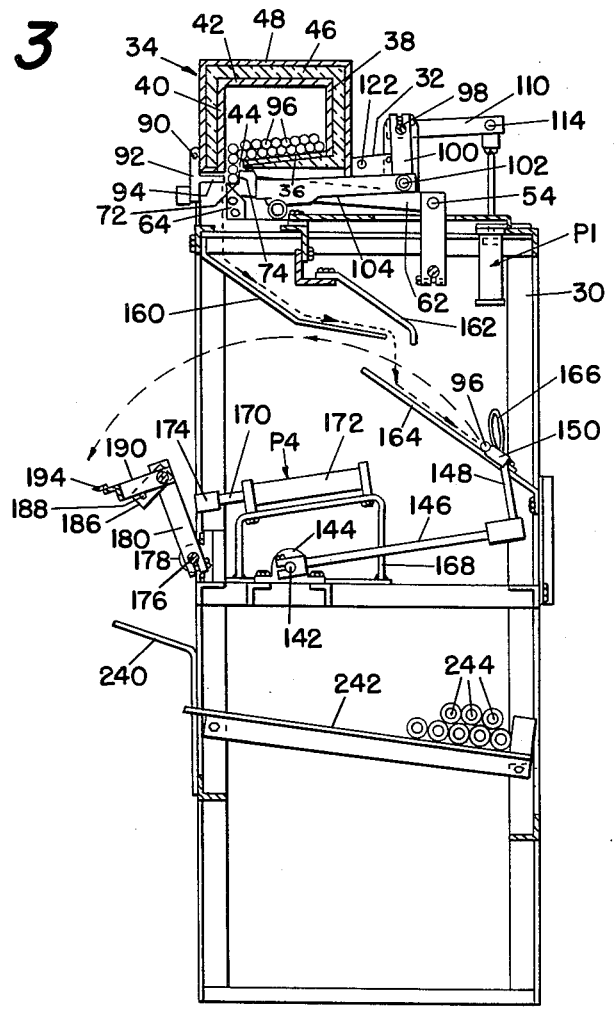
FIGURE 3 is an enlarged vertical section on the plane indicated by line 3—3 of FIGURE 2, showing a mandrel positioned for delivery to the tube rolling machine.

Referring particularly to FIGURE 1, the apparatus constructed in accordance with the invention comprises a tube rolling machine, generally designated 10, in close association with a mandrel handling machine, generally designated 12.

Except as noted hereinafter, reference may be had to the pending application of Harry L. Hildebrand, filed June 13, 1960, Serial No. 35,552, for the disclosure of details relating to the construction and operation of the tube rolling machine 10. It may be noted, however, that a web 14 of sheet material is threaded through a twister device 16 and a web feed device 18 including a pneumatic motor P6 which actuates a rack 20. The web 14 extends over a rear mandrel support roller 24 and a front mandrel support roller 26. Overlying these support rollers is a head roller 28.

The mandrel handling machine 12 comprises a rigid floor-supported frame, generally designed 30, which carries a pair of brackets 32 mounting a mandrel feed hopper 34. This feed hopper is provided with a rearwardly and downwardly sloping bottom wall 36, upright front and rear walls 38 and 40 and a horizontally extending top wall 42. The bottom wall 36 is set back from the rear wall 40 thereby to form a mandrel discharge opening 44. Overlying the walls 38, 40 and 42 of the hopper is suitable insulation designated 46, and overlying this insulation is an outer cover designated 48. One end of the hopper is closed, as at 50, while the opposite end is provided with a hinged access door designated 52. Means (not shown) are provided for electrically heating the hopper.

Figure 7:
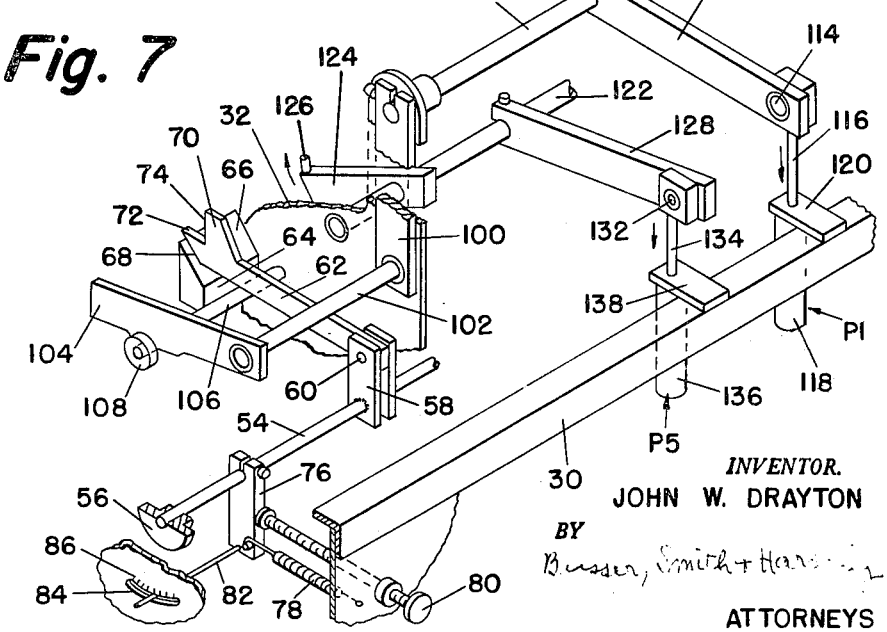
FIGURE 7 is a fragmentary perspective view looking at the front of the mandrel handling machine.

Referring particularly to FIGURES 3 and 7, a horizontally extending shaft 54 is provided with opposite end portions journalled in bearings 56 carried by frame 30. Affixed to longitudinally spaced portions of the shaft 54 respectively are a pair of upright arms 58 each of which has pivoted thereto, as at 60, a bar 62 which extends rearwardly from the arm 58. The free end portion of the bar 62 is supported by an underlying block 64 affixed to the associated bracket 32. The block 64 is provided with a forwardly and downwardly extending cam surface 66, and the overlying portion of the bar 62 is correspondingly beveled, as at 68. Extending upwardly from the bar 62 is a projection 70 immediately in front of a horizontally extending ledge 72 and having an upright shoulder 74. Depending from the shaft 54 is an arm 76 to which is attached one end of a tension spring 78. The opposite end of the tension spring 78 is secured to the frame 30. Overlying the tension spring 78 is an adjusting screw 80 threaded through the frame 30 and engaging the arm 76. Fastened to the arm 76 by one end thereof is an indicating pin 82 which extends freely through an arcuate opening 84 in one end of the frame 30. Associated with this arcuate opening is a scale designated 86. Referring particularly to FIGURES 2 and 3, the rear wall of the hopper 34 is supported by a pair of brackets 88, each of which has pivoted thereto, as at 90, a weighted arm 92, which arm is provided with a projection 94 extending forwardly under the rear wall of the hopper.

Figure 4:
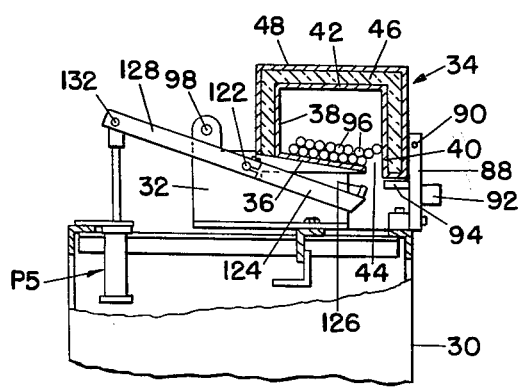
FIGURE 4 is an enlarged vertical section on the plane indicated by line 4—4 of FIGURE 2.

Referring particularly to FIGURES 3 and 4, the ledges 72 underlie the discharge opening 44 of the hopper 34, while the shoulders 74 are approximately aligned with the associated edge of the hopper's bottom wall 36. The projections 94 are disposed opposite the shoulders 74 and terminate flush with the inner face of the rear wall 40 of the hopper 34. Mandrels 96 stored in the hopper 34 roll toward the discharge opening 44 and are discharged therethrough one by one onto the ledges 72. They are kept from rolling off the ledges 72 by the projections 94 of the weighted arms 92.

Referring particularly to FIGURES 3 and 7, a horizontally extending shaft 98 is provided with opposite end portions journalled in brackets 32. Affixed to each end of the shaft 98 is a depending arm 100, and affixed to the lower end portion of the arm 100 is a horizontally extending bar 102. Rockably carried by the free end portion of bar 102 is a rearwardly extending arm 104. The free end portion of the each bar 104 is carried by a horizontally extending bar 106 affixed by one end to the associated bracket 32 and fitted with a guide disc 108. Affixed to the shaft 98 is a forwardly extending bar 110 associated with a pneumatic motor, generally designated P1. The bar 110 carries a pivot element 114 to which is attached the piston rod 116 of the motor, which piston rod works in a cylinder 118 carried by a bracket 120 secured to the frame 30.

A horizontally extending shaft 122 is provided with opposite end portions journalled in the brackets 32. Affixed to each opposite end portion of shaft 122 is a downwardly and rearwardly extending arm 124 which mounts an upright agitator element 126. Affixed to the shaft 122 is a forwardly extending arm 128 associated with a pneumatic motor, generally designated P5. The arm 128 carries a pivot element 132 to which is connected the piston rod 134 of the motor, which piston rod works in a cylinder 136 carried by the bracket 138 secured to the frame 30.

Referring particularly to FIGURE 2, a horizontally extending shaft 142 is journalled in bearings 144 and mounts three arms 146 affixed respectively to longitudinally spaced portions of the shaft. Now referring particularly to FIGURE 3, each arm 146 is provided with a lateral extension 148 terminating in an electromagnet 150. Now referring particularly to FIGURE 6, one end portion of the shaft 142 is fitted with a gear 152, which gear meshes with an upright rack 154 guided by rollers 156 and actuated by a pneumatic motor, generally designated P2, provided with a piston rod 157, which piston rod works in a cylinder 158 secured to the frame 30.

Referring particularly to FIGURES 2 and 3, a pair of guide bars 160 extend downwardly and forwardly from the upper rear corner of the frame 30. Associated with these guide bars are a pair of guard bars 162. Below the guide bars 160 are a set of three guide bars 164 extending upwardly and rearwardly from the front of the frame 30 and mounting leaf spring stops 166.

Carried by the frame 30 are a pair of brackets 168, each of which mounts a pneumatic motor, generally designated P4, having a piston rod 170 which works in a cylinder 172. Each piston rod 170 mounts an electromagnet 174.

Figure 6:
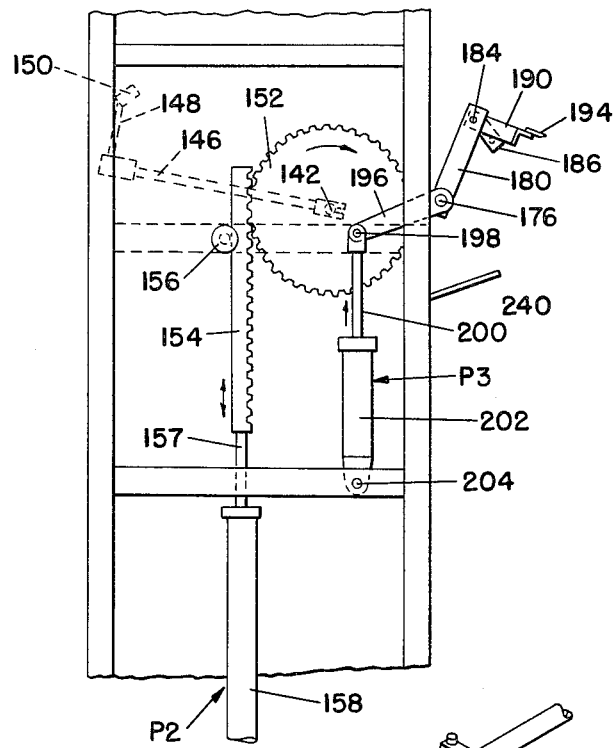
FIGURE 6 is a fragmentary end view of the mandrel handling machine.

Referring particularly to FIGURES 2, 3 and 5, a horizontally extending shaft 176 is journalled in bearings 178. Affixed to an intermediate portion of the shaft 176 is an arm 180 and affixed to one end portion of the shaft 176 is an arm 182. Corresponding portions of the arms 180 and 182 have journalled therein respectively axially spaced portions of a shaft 184. Affixed to axially spaced portions of the shaft 184 are a pair of arms 186, each of which carries a pin 188 which supports the free end portion of an arm 190 extending from, and pivotally connected to, the shaft 184. The free end portions of the arms 190 carry an angle bar 192 upon which is mounted a wrapping bar 194. Referring particularly to FIGURE 6, affixed to the shaft 176 is an arm 196 associated with a pneumatic motor, generally designated P3. The arm 196 carries a pivot element 198 to which is attached the piston rod 200 of the motor, which piston rod works in a cylinder 202 pivoted, as at 204, to the frame 30.

Referring particularly to FIGURE 5, one end portion of the arm 182 is pivotally connected, as at 206, to an upwardly and forwardly extending link 208. Affixed to the shaft 184 is a forwardly extending arm 210 which has a free end portion pivoted, as at 212, to a link 214 which in turn is pivoted, as at 216, to an intermediate portion of the link 208. The free end portion of the link 208 mounts a roller 218. Fixedly mounted upon the frame 30 is a bar 220 provided with an upwardly and forwardly extending cam surface 222 upon which the roller 218 bears and over which it may travel. Frame 30 also mounts a bracket 224 to which is pivoted, as at 226, a bar 228, the free end portion of which is provided with an upwardly and forwardly extending cam surface 230. The bar 228 is biased upwardly by a tension spring 232 anchored to the frame 30. The bar 228 is provided with an upright extension 234 which engages with the end of an adjusting screw 236 threaded through the frame 30.

Referring particularly to FIGURE 3, mounted upon the frame 30 are a pair of downwardly and rearwardly sloping guides 240 and a discharge hopper 242 adapted for receiving mandrels and the tubes formed thereon, designated 244, discharged from the tube winding machine.

Figure 17:
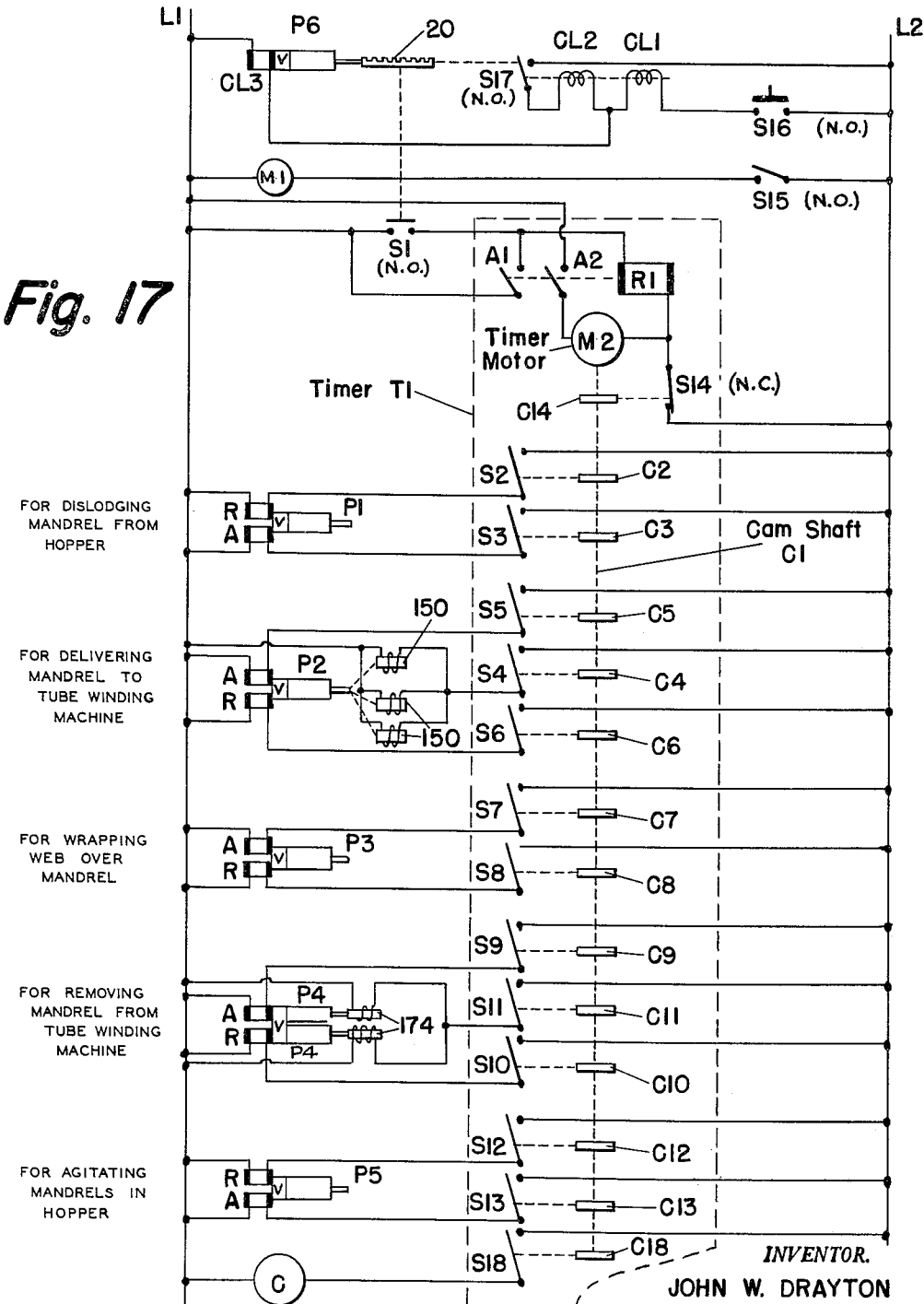
FIGURE 17 is a wiring diagram.

Referring particularly to FIGURE 17, a synchronous motor driven cam timer, generally designated T1, is housed in a casing 245. A timer suitable for the purpose intended is manufactured by the Industrial Timer Corporation, Newark 4, New Jersey (Bulletin No. 200; Synchronous Motor Driven Cam Timers; Series RC, Single Cycle Multi-Cam Timer). The timer T1 is provided with a relay R1 having an armature with contacts at A1 and a second armature with contacts at A2, a momentary switch S14, a timer electric motor M2, and a cam shaft C1 mounting a set of cams C2 to C14 and C18 adapted to operate a set of switches S2 to S14 and S18. Normally open momentary switches are designated S1 and S16. A normally open manually closed manually opened switch is designated S15. A normally open solenoid controlled switch is designated S17. CL1 and CL2 are the coils of the solenoid controlled switch S17, while CL3 is the coil of the pneumatic motor P6. The electric motor of the tube winding machine is designated M1, and a magnetic clutch associated with the motor M1 is designated C. Each pneumatic motor, designated P1–P5, has associated therewith an advance coil A and a retract coil R. Associated with pneumatic motor P2 are electromagnets 150, and associated with pneumatic motors P4 are electromagnets 174.

The switch S1, relay R1 and momentary switch S14 are connected in series across the main leads L1 and L2. The contacts at A1 are in a lead across the switch S1. The contacts at A2, motor M2 and switch S14 are connected in series across the main leads L1 and L2. Each coil of the motors P1 to P5 is connected in series with the corresponding switches S2, 3, 5 to 10 and 12 and 13 across the leads L1 and L2. The electromagnets 150 are connected in parallel with each other and in series with the switch S4 across the leads L1 and L2, while the electromagnets 174 are connected in parallel with each other and in series with the switch S11 across the leads L1 and L2. The magnetic clutch C is connected in series with the switch S18 across the leads L1 and L2. The motor M1 is connected in series with the switch S15 across the leads L1 and L2. The coil CL3 of the motor P6 is connected in series with the coil CL1 and switch S16 across the leads L1 and L2, and the coil CL2 and switch S17 are connected in series with one another and in parallel with the coil CL1 and switch S16.

In the operation of the apparatus, normally open switch S15 is closed, whereupon the main motor M1 operates continuously. Now the normally open momentary switch S16 is operated, whereupon coil CL1 is energized and switch S17 is closed. Thus coil CL2 is energized and holds switch S17 closed when switch S16 reopens and coil CL1 is deenergized. When switch S17 closes, coil CL3 of motor P6 is energized and the associated valve of P6, which normally is in a neutral position, is operated to supply fluid pressure for extending the web feed rack 20. Thus the web 14 of sheet material is fed over the rollers 24 and 26. When rack 20 reaches the end of its excursion, it operates the valve to supply air for returning the rack to its initial position. As rack 20 approaches its initial position, it reopens the switch S17 (whereupon coil CL3 is deenergized) and returns the valve to its neutral position.

As the rack 20 approaches the limit of its outward movement is operates the normally open momentary switch S1, whereupon operation of the timer T1 is initiated. When switch S1 is operated, relay R1 is energized, whereupon the contacts at A1 and A2 are closed. The contacts at A1 hold relay R1 energized when switch S1 reopens. Thus the timer motor M2 turns cam shaft C1. At the end of one revolution of the cam shaft, cam C14 operates normally closed momentary switch S14, whereupon relay R1 is deenergized and the contacts at A1 and A2 reopen. Thus operation of the timer motor M2 is terminated.

When the timer motor begins to operate, cam C2 closes switch S2, thus closing the retract circuit of motor P1. The valve of P1 is operated, and air is supplied to the motor for moving piston rod 116 downwardly. Thus (through arm 110, shaft 98, arms 100 and bars 102) arms 104 are moved rearwardly over bars 106, in consequence of which a mandrel 96, resting upon the ledges 72, is pushed off these ledges against the influence of weighted arms 92. The mandrel thus discharged from the hopper drops onto guide bars 160 and rolls downwardly and forwardly, dropping off the ends of bars 160 onto guide bars 164, whereupon it rolls downwardly and forwardly over bars 164 to spring stops 166. In the meantime, cam C2 operates switch S2 to reopen the retract circuit of motor P1.

Then cam C3 closes switch S3, thus closing the advance circuit of motor P1. The valve of motor P1 is operated, and air is supplied to the motor for moving rod 116 upwardly, in consequence of which bars 106 are returned to their initial positions.

When mandrel 96 comes to rest against spring stops 166, cam C5 closes switch S5, thus closing the advance circuit of motor P2. The valve of P2 is operated, and air is supplied to the motor for moving piston rod 157 and rack 154 upwardly. Thus the gear 152 and the shaft 142 are turned clockwise, as viewed in FIGURE 6. At the same time the cam C4 closes the switch S4, whereupon the electromagnets 150 are energized. As viewed in FIGURE 3, the shaft 142, arms 146, extensions 148, electromagnets 150 and the mandrel 96, which is held by the electromagnets, all turn counterclockwise in mandrel delivering direction, the mandrel passing freely between the guide bars 160 and 164 and being positioned over the web support rollers 24 and 26. As the mandrel approaches the rollers, it engages the web 14 of sheet material and forces the underlying portion of the sheet material into the cradle formed by the rollers, whereupon the terminal portion of the sheet material turns upwardly. The heat of the mandrel quickly softens the resins with which the sheet material is impregnated and thereby takes the spring out of the latter so that the mandrel will not be dislodged when it is released. Now the cams C4 and C5 operate the switches S4 and S5 to reopen the corresponding circuits, whereupon the mandrel is released.

Now cam C6 operates switch S6, thus closing the retract circuit of motor P2. The valve of motor P2 is operated, and air is supplied to the motor for moving the piston rod 157 and rack 154 downwardly, in consequence of which the gear 152, shaft 142, arms 146, extensions 148 and electromagnets 150 turn back to their initial positions, whereupon the cam C6 operates switch S6 to reopen the retract circuit of motor P2.

Now cam C7 operates switch S7, thus closing the advance circuit of motor P3. The valve of P3 is operated, and air is supplied to the motor for moving the piston rod 200 upwardly. The arm 196 and shaft 176 are turned clockwise, as viewed in FIGURE 6. Arms 180 and 182 carry shaft 184 about the shaft 176 in a clockwise direction. Referring particularly to FIGURES 5, and 8–11, roller 218 moves upwardly and forwardly over cam 222, guiding the beveled leading edge of bar 194 rearwardly and downwardly (see FIGURE 12). As the piston rod 200 approaches the limit of its upward movement, roller 218 passes onto cam 230, guiding the beveled edge of the bar 194 upwardly and rearwardly. Thus the beveled edge of bar 194 moves under the terminal portion of the web 14 of sheet material and wraps it over the top of the mandrel, whereupon it dwells (see FIGURE 13).

In the meantime, a timer cam (not shown) closes a circuit that causes head roller 28 to descend. Just before the head roller reaches bar 194, cam C7 operates switch S7, thus reopening the advance circuit of the motor P3. Now cam C8 operates switch S8, thus closing the retract circuit of motor P3. The valve of motor P3 is operated, whereupon air is supplied to the motor for moving the piston rod 200 downwardly and retracting the bar 194 to its initial position. As the bar 194 retracts, the head roller 28 engages with the web 14.

Now cam C18 closes switch S18, thus energizing magnetic clutch C. The main motor M1 now turns rollers 24, 26 and 28 for winding the tube (see FIGURE 14). When the tube is of the desired diameter, cam C18 operates switch S18, thus deenergizing magnetic clutch C and terminating the winding operation. The cam that closed the circuit that caused the head roller to descend reopens the circuit and still another timer cam (not shown) closes a circuit that causes the head roller to return to its initial position. It will be understood that additional timer cams and switches (not shown) are provided for controlling the twister device 16 and a cutter bar (not shown) for severing the web 14.

Now cam C9 operates switch S9, thus closing the advance circuit of P4. The valve of motor P4 operates, thus supplying air to the motor for extending piston rods 170. The electromagnets 174 carried by piston rods 170 engage with the opposite end portions of the mandrel (see FIGURE 15). In the meantime, cam C11 operates switch S11, thus energizing the electromagnets 174. Now cam C9 operates switch S9, to reopening the advance circuit of motor P4.

Then cam C10 operates switch S10, thus closing the retract circuit of motor P4. The valve of motor P4 is operated to supply air to the motor for retracting piston rods 170 and electromagnets 174 carried thereby. Thus the mandrel and the tube formed thereon are removed from the tube winding machine. As piston rods 170 approach their initial positions, cam C11 operates switch S11, thus deenergizing electromagnets 174, whereupon the mandrel drops to brackets 240 (see FIGURE 16) and rolls downwardly and forwardly into the discharge hopper 242, coming to rest, as at 244.

The cam C12 now operates switch S12, thus closing the retract circuit of motor P5. The valve of motor P5 is operated, and air is supplied to the motor for moving piston rod 134 downwardly, whereupon agitator elements 126 (through arm 128, shaft 122 and arms 124) move upwardly into the mandrel discharge opening 44 of the hopper for agitating the mandrels 96 thereby to prevent bridging thereof over the opening 44. Cam C12 then operates switch S12 to reopen the retract circuit of motor P5. Then cam C13 operates switch S13, thus closing the advance circuit of motor P5. The valve of motor P5 is operated, and air is supplied to the motor for moving the rod 134 upwardly to retract the elements 126 to their initial positions. Thus one cycle of the machine is completed.

The mandrel handling machine is capable of handling different sizes of mandrels. For this purpose, adjusting screw 80 may be manipulated to turn shaft 54 for adjusting the fore and aft positions of the bars 62. By moving bars 62 rearwardly, shoulders 74 are moved rearwardly, making the effective size of mandrel discharge opening 44 smaller. At the same time, ledges 72 are raised, making the vertical spacing of ledges 72 from the bottom of the hopper (i.e., the effective size of the opening through which the mandrel is pushed by bars 104) smaller. By moving bars 62 forwardly, the effective sizes aforesaid are made larger.

It will be understood, of course, that the cams of the timer T1 are adjusted to effect operation of the several parts of the apparatus in predetermined timed relation for the purpose intended, and that they may be readjusted as required for winding a tube of a different diameter. In addition, it will be understood that provision may be made for operation of the apparatus automatically in repeating cycles.

Figure 8:
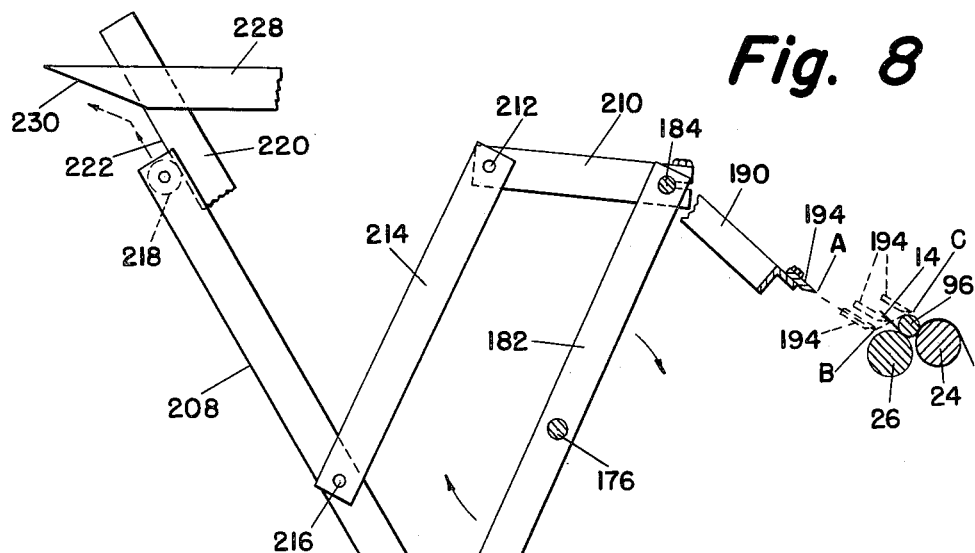
FIGURE 8 is an enlarged section on the plane indicated by line 8—8 of FIGURE 2, showing certain linkage in one extreme position.
Figure 9:
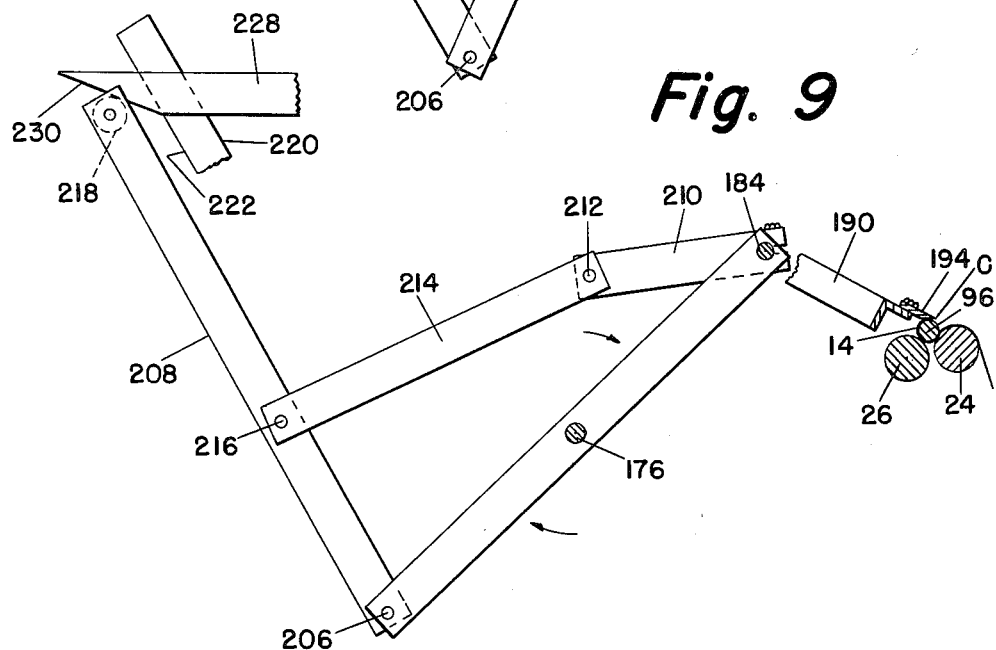
FIGURE 9 is similar to FIGURE 8, but shows the linkage in the other extreme position.

Referring particularly to FIGURES 8 and 9, when a tube is wound upon a mandrel that is relatively large in diameter, as shaft 176 turns clockwise, roller 218 moves upwardly and forwardly over cam 222 until it engages cam 230. At the same time, the beveled leading edge of the wrapping bar 194 moves downwardly and rearwardly from point A to point B, the latter point being near roller 26. Continued clockwise movement of shaft 176 causes roller 218 to leave cam 222 and move upwardly and forwardly over cam 230. At the same time, the leading edge of bar 194 moves upwardly and rearwardly from point B to point C. The arms 190 which carry the bar 194 remain seated upon pins 188. In moving from point B to point C the leading edge of the bar 194 engages under the end of web 14 of sheet material and wraps the same over the top of the mandrel, as illustrated in FIGURE 9.

Now referring particularly to FIGURES 10 and 11, when a tube is to be wound upon a mandrel that is relatively smaller in diameter, adjusting screw 236 is turned out somewhat, whereupon bar 228 and cam 230 are raised by tension spring 232. As shaft 176 turns clockwise, roller 218 moves over cam 222 until it engages cam 230. However, before it reaches the latter, the leading edge of bar 194 passes through point B and continuing downwardly and rearwardly engages the surface of roller 26, as at point D, and as roller 218 approaches cam 230, the leading edge of bar 194 moves over the surface of roller 26 in contact therewith to point E, in consequence of which arms 190 are lifted from pins 188 and turned about shaft 184. Continued clockwise movement of shaft 196 causes roller 218 to leave cam 222 and move upwardly and forwardly over cam 230, in the adjusted position thereof. At the same time, the arms 190 are reseated upon the pins 188 and the leading edge of bar 194 moves upwardly and rearwardly from point E to point F. In doing so it engages under the end of the web 14 of sheet material and wraps it over the top of the mandrel, as illustrated in FIGURE 11.

It will be understood, of course, that the present invention, as shown and described, is susceptible of various changes and modifications which may be made without any departure from the general principles or real spirit of the invention. Accordingly, it is intended to claim the present invention broadly as well as specifically as indicated in the appended claims.

What is claimed is:

1. Apparatus for winding material about a mandrel including, support means, means for placing an end portion of the material across said support means, means for pre-heating a mandrel, means for depositing said preheated mandrel on said end portion so that the end portion curls toward said mandrel, means for initially wrapping said curled portion at least partially about said mandrel and remaining in continuous engagement with said portion until said initial wrapping is completed, and means for rotating said mandrel for winding said material thereon.

2. Apparatus for winding material about a mandrel including first and second rollers positioned immediately adjacent each other and forming a cradle therebetween, means for positioning a free end portion of material across said cradle, means for depositing a mandrel on said material directly above said cradle so that said material is forced into said cradle and simultaneously engaged between both of said rollers and said mandrel a short distance from the free end of said material, means positioned above said rollers for engaging the free end of said material, means for moving said engaging means in an arcuate path about said mandrel for flatly wrapping the free end of said material about said mandrel so as to prevent the formation of a folded tuck in said material, a third roller, means for moving said third roller into pressing engagement with said flatly wrapped end of said material, and means for driving at least one of said rollers for continuing to wind said material about said mandrel.

3. The apparatus as claimed in claim 2 further including means for adjusting the curvature of the arcuate path traversed by said engaging means so that said material may be wrapped about different size mandrels.

4. Apparatus for winding resin coated paper so as to form a laminated tube comprising a pair of rollers positioned immediately adjacent each other and forming a cradle therebetween, means for positioning a free end portion of said paper across said cradle, means for depositing a hot mandrel on said paper directly above said cradle for forcing said paper into said cradle between both of said rollers and said mandrel whereby the free end of said paper tends to curl about said mandrel, means positioned above said rollers for engaging said curled end of paper and wrapping said end flatly about said mandrel, means for moving said engaging means in an arcuate path about said mandrel while in engagement with said curled end for preventing the formation of a folded tuck in said paper upon the initial winding thereof about said mandrel, a third roller positioned above said mandrel, means for moving said third roller into pressing engagement with said flatly wrapped end of said paper, and means for driving at least one of said rollers for continuing to wind said paper about said mandrel so as to produce a laminated tube thereof.

5. Apparatus for supplying metallic mandrels to a material winding device including thermally insulated storage means for storing a plurality of heated mandrels, means for discharging one mandrel at a time at spaced intervals, a pair of electromagnets positioned so as to engage and magnetically hold each of said mandrels as it is discharged, transfer means supporting said electromagnets, means mounting said transfer means for movement into a predetermined position in said winding device, and means for deenergizing said electromagnets so as to magnetically release said mandrel in said predetermined position.

6. Apparatus for supplying hot metallic mandrels to a device for winding resin coated paper thereabout to form laminated tubes comprising thermally insulated storage means for storing a plurality of said hot mandrels, means for discharging one mandrel at a time at spaced intervals, a pair of magnetic means positioned so as to engage and magnetically hold each of said mandrels as it is discharged, transfer means supporting said magnetic means, means mounting said transfer means for movement into a predetermined position in said winding device, and means for disengaging said mandrel from said magnetic means so as to deposit said mandrel in said predetermined position in said winding device.

References Cited in the file of this patent
UNITED STATES PATENTS

| | | |
|---|---|---|
| 2,537,588 | Husson | Jan. 9, 1951 |
| 2,613,043 | Kmentt | Oct. 7, 1952 |
| 2,670,152 | Priest | Feb. 23, 1954 |
| 2,676,764 | Aulen | Apr. 27, 1954 |
| 2,682,379 | Piper et al. | June 29, 1954 |
| 2,733,019 | Goodwillie | Jan. 31, 1956 |
| 2,750,127 | Birr | June 12, 1956 |
| 2,801,810 | Kusel | Aug. 6, 1957 |
| 2,830,775 | Kiesel | Apr. 15, 1958 |
| 2,840,320 | Csutor | June 24, 1958 |
| 2,961,182 | Beerli | Nov. 22, 1960 |
| 2,989,262 | Hornbostel | June 20, 1961 |
| 3,030,042 | De Gelleke | Apr. 17, 1962 |